United States Patent
Courtney et al.

(10) Patent No.: US 7,828,866 B2
(45) Date of Patent: Nov. 9, 2010

(54) DIRT AND DUST CYCLONIC SEPARATING APPARATUS

(75) Inventors: Stephen Benjamin Courtney, Bath (GB); James Dyson, Gloucestershire (GB); Ricardo Gomiciaga-Pereda, Wiltshire (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 393 days.

(21) Appl. No.: 11/794,226

(22) PCT Filed: May 9, 2006

(86) PCT No.: PCT/GB2006/001678

§ 371 (c)(1),
(2), (4) Date: Feb. 14, 2008

(87) PCT Pub. No.: WO2006/125946

PCT Pub. Date: Nov. 30, 2006

(65) Prior Publication Data

US 2008/0172994 A1    Jul. 24, 2008

(30) Foreign Application Priority Data

May 27, 2005    (GB) ................... 0510862.6

(51) Int. Cl.
*B01D 45/12*    (2006.01)
(52) U.S. Cl. ............... 55/343; 55/349; 55/429; 55/459.1; 55/DIG. 3
(58) Field of Classification Search ........... 55/343, 55/349, 429, 459.1, DIG. 3
See application file for complete search history.

(56) References Cited

U.S. PATENT DOCUMENTS

| | | | |
|---|---|---|---|
| 3,425,192 A | 2/1969 | Davis | |
| 3,724,176 A | 4/1973 | Vishnevsky et al. | |
| 4,373,228 A | 2/1983 | Dyson | |
| 5,129,124 A | 7/1992 | Gamou et al. | |
| 6,238,451 B1 | 5/2001 | Conrad et al. | |
| 6,607,572 B2 | 8/2003 | Gammack et al. | |
| 2006/0230724 A1* | 10/2006 | Han et al. | 55/345 |
| 2009/0031524 A1 | 2/2009 | Courtney et al. | |

FOREIGN PATENT DOCUMENTS

EP    0 042 723    8/1985

(Continued)

OTHER PUBLICATIONS

Courtney et al., Express Notice of Abandonment filed in co-pending U.S. Appl. No. 11/794,227 dated Mar. 31, 2009; 2 pages.

(Continued)

*Primary Examiner*—Robert A Hopkins
(74) *Attorney, Agent, or Firm*—Morrison & Foerster LLP

(57) ABSTRACT

A cyclonic separating apparatus includes a first cyclonic separating unit including at least one first cyclone, a second cyclonic separating unit located downstream of the first cyclonic separating unit and including at least one second cyclone, and a third cyclonic separating unit located downstream of the second cyclonic separating unit and including at least one third cyclone. The separation efficiency of the second cyclonic separating unit is substantially the same as the separation efficiency of either the first cyclonic separating unit or the third separating unit, providing an apparatus which achieves a higher separation efficiency than known separation apparatus.

23 Claims, 6 Drawing Sheets

FOREIGN PATENT DOCUMENTS

| | | |
|---|---|---|
| EP | 0 613 935 | 9/1994 |
| EP | 0728435 | 8/1996 |
| EP | 1157651 | 11/2001 |
| EP | 1 268 076 B1 | 10/2004 |
| GB | 2360719 | 10/2001 |
| GB | 2367019 | 3/2002 |
| GB | 2367511 | 4/2002 |
| GB | 2372470 | 8/2002 |
| GB | 2 424 603 | 10/2006 |
| GB | 2424606 | 3/2007 |
| JP | 50-84964 | 7/1975 |
| JP | 52-14775 | 2/1977 |
| JP | 63-28144 | 2/1988 |
| JP | 7-3270 | 1/1995 |
| JP | 7-186041 | 7/1995 |
| JP | 2002-326041 | 11/2002 |
| JP | 2004-520138 | 7/2004 |
| KR | 2002-0078798 | 10/2002 |
| WO | WO-02/067753 | 9/2002 |

OTHER PUBLICATIONS

Courtney et al., Suggestion of Interference under 37 CFR 41.202(a) filed in co-pending U.S. Appl. No. 11/794,227 dated Dec. 9, 2008; 14 pages.

Courtney et al., Suggestion of Interference under 37 CFR 41.202(a) filed in co-pending U.S. Appl. No. 11/794,227 dated Dec. 30, 2008; 29 pages.

Grounds of Invalidity issued by the High Court, Chancery Division of the United Kingdom served Sep. 10, 2007.

Retail advertisement of Dyson vacuum cleaner model DC07 published Jun. 2001, 12 pages.

Retail advertisement of Dyson vacuum cleaner model DC08 published Apr. 2002, 14 pages.

Retail advertisement of Dyson vacuum cleaners similar to models DC07 and DC08 published Mar. 29, 2005, 4 pages.

GB search report mailed on May 15, 2008 directed at counterpart application No. 0510862.6; 4 pages.

GB Search Report dated Sep. 28, 2005, directed to counterpart GB Application No. 0510864; 1 page.

International Search Report dated Aug. 8, 2006, directed to counterpart International Application No. PCT/GB2006/001661; 3 pages.

Japanese Notice of Reasons for Rejection mailed Feb. 16, 2010, directed to counterpart Japanese Application No. 2008-512898; 5 pages.

Courtney, S., et al., U.S. Office Action mailed Jun. 28, 2010, directed to U.S. Appl. No. 11/794,514; 7 pages.

\* cited by examiner

DIRT AND DUST CYCLONIC SEPARATING APPARATUS

REFERENCE TO RELATED APPLICATIONS

This application is a national stage application under 35 USC 371 of International Application No. PCT/GB2006/001678, filed May 9, 2006, which claims the priority of United Kingdom Application No. 0510862.6, filed May 27, 2005, the contents of both of which prior applications are incorporated herein by reference.

FIELD OF THE INVENTION

The invention relates to cyclonic separating apparatus. Particularly, but not exclusively, the invention relates to cyclonic separating apparatus suitable for use in vacuum cleaners.

BACKGROUND OF THE INVENTION

Vacuum cleaners which utilise cyclonic separating apparatus are well known. Examples of such vacuum cleaners are shown in EP 0042723, U.S. Pat. Nos. 4,373,228, 3,425,192, 6,607,572 and EP 1268076. In each of these arrangements, first and second cyclonic separating units are provided with the incoming air passing sequentially through each separating unit. In some cases, the second cyclonic separating unit includes a plurality of cyclones arranged in parallel with one another.

SUMMARY OF THE INVENTION

None of the prior art arrangements achieves 100% separation efficiency (ie the ability reliably to separate entrained dirt and dust from the airflow), particularly in the context of use in a vacuum cleaner. Therefore, it is an object of the invention to provide cyclonic separating apparatus which achieves a higher separation efficiency than the prior art.

The invention provides cyclonic separating apparatus comprising: a first cyclonic separating unit including at least one first cyclone; a second cyclonic separating unit located downstream of the first cyclonic separating unit and including at least one second cyclone; and a third cyclonic separating unit located downstream of the second cyclonic separating unit and including at least one third cyclone; characterised in that the separation efficiency of the second cyclonic separating unit is substantially the same as the separation efficiency of either the first cyclonic separating unit or the third cyclonic separating unit.

Cyclonic separating apparatus according to the invention has the advantage that, when the apparatus is considered as a whole, it has a separation efficiency which is improved as compared to the individual separation efficiencies of the individual cyclonic separating units. The provision of at least three cyclonic separation units in series increases the robustness of the system so that any variations in the airflow presented to the downstream units have little or no effect on the ability of those units to maintain their separation efficiency. The separation efficiency is therefore also more reliable as compared to known cyclonic separating apparatus.

It will be understood that, by the term "separation efficiency", we mean the ability of a cyclonic separating unit to separate entrained particles from an airflow and that, for comparison purposes, the relevant cyclonic separation units are challenged by identical airflows. Hence, in order for a first cyclonic separating unit to have a higher separation efficiency than a second cyclonic separating unit, the first unit must be capable of separating a higher percentage of entrained particles from an airflow than the second unit when both are challenged under identical circumstances. Factors which can influence the separation efficiency of a cyclonic separating unit include the size of the inlet and outlet, the angle of taper and length of the cyclone, the diameter of the cyclone and the depth of the cylindrical inlet portion at the upper end of the cyclone.

If the second cyclonic separating unit has a separation efficiency which is the same as the first cyclonic separating unit, this has the effect of providing the incoming airflow with two "sweeps" through a relatively low efficiency cyclone separating unit before the third, higher efficiency, cyclone separating unit is challenged. The airflow is therefore cleaned of larger dirt and dust particles, and also a significant proportion of fine dust, prior to entering the third cyclonic separating unit. The third cyclonic separating unit is thus able to operate under favourable conditions which allow it to achieve a relatively high separation efficiency. In this way, the apparatus as a whole cleans the airflow reliably and to a high standard.

If the second separating unit has a separation efficiency which is the same as the third cyclonic separating unit, the airflow has two "sweeps" through a relatively high efficiency cyclonic separating unit before it is ejected from the apparatus. Having had any relatively large dirt and debris removed from the airflow, the airflow then makes a first sweep through a relatively high efficiency cyclonic separating unit in which a large proportion of the remaining dust is separated. The third cyclonic separating unit is then allowed to operate under advantageous conditions in which a high separation efficiency can be achieved.

Preferably, the first cyclonic separating unit comprises a single first cyclone and, more preferably, the or each first cyclone is substantially cylindrical. This arrangement encourages larger particles of dirt and debris to be reliably collected and stored with a relatively low risk of re-entrainment.

Preferably, the second cyclonic separating unit comprises a plurality of second cyclones arranged in parallel and the third cyclonic separating unit comprises a plurality of third cyclones arranged in parallel and, more preferably, the number of second cyclones is lower than the number of third cyclones. The increasing number of cyclones in each successive cyclonic separating unit allows the size of each individual cyclone to decrease in the direction of the airflow. The fact that the airflow has passed through a number of upstream cyclones means that the larger particles of dirt and dust will have been removed which allows each smaller cyclone to operate efficiently and without risk of blockage.

BRIEF DESCRIPTION OF THE DRAWINGS

Embodiments of the invention will now be described with reference to the accompanying drawings, in which.

DETAILED DESCRIPTION OF THE INVENTION

Figure 1:
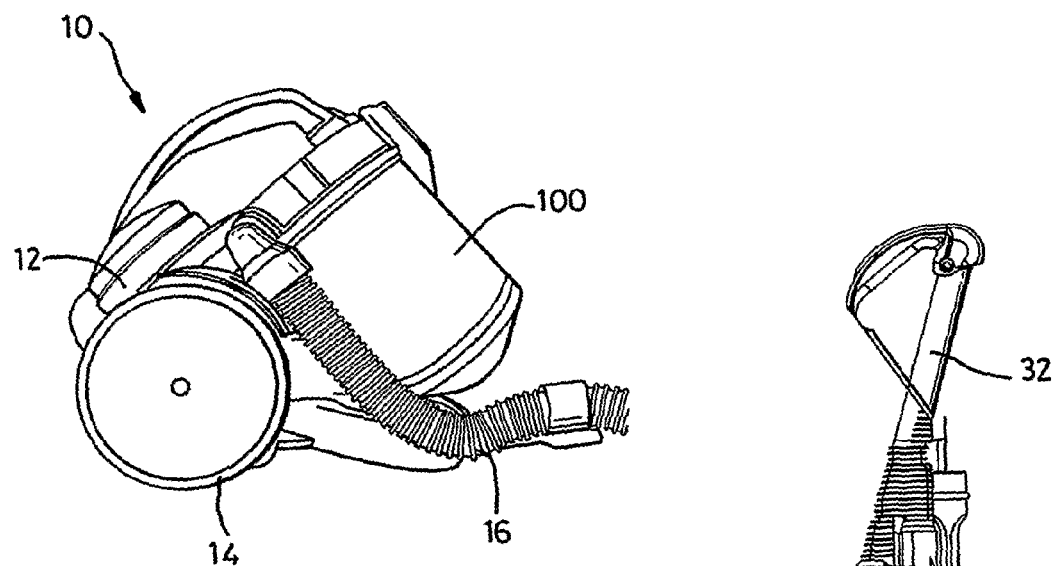
FIGS. 1 and 2 show cylinder and upright vacuum cleaners respectively incorporating cyclonic separating apparatus according to the invention.

FIG. 1 shows a cylinder vacuum cleaner 10 having a main body 12, wheels 14 mounted on the main body 12 for manoeuvring the vacuum cleaner 10 across a surface to be cleaned, and cyclonic separating apparatus 100 also mounted on the main body 12. A hose 16 communicates with the cyclonic separating apparatus 100 and a motor and fan unit (not shown) housed within the main body 12 for drawing a dirty airflow into the cyclonic separating apparatus 100 via the hose 16. Commonly, a floor-engaging cleaner head (not shown) is coupled to the distal end of the hose 16 via a wand to facilitate manipulation of the dirty air inlet over the surface to be cleaned.

In use, air drawn into the cyclonic separating apparatus 100 via the hose 16 has entrained dirt and dust separated therefrom in the cyclonic separating apparatus 100. The dirt and dust is collected within the cyclonic separating apparatus 100 while the cleaned air is channeled past the motor for cooling purposes before being ejected from the vacuum cleaner 10 via an exit port in the main body 12.

Figure 2:
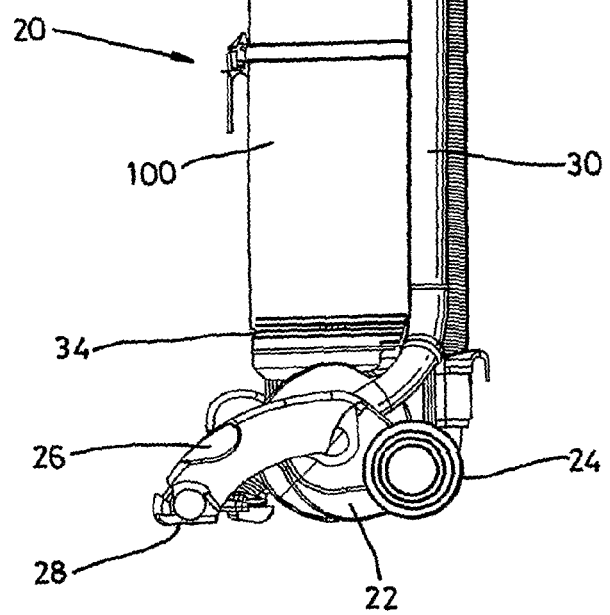

The upright vacuum cleaner 20 shown in FIG. 2 also has a main body 22 in which a motor and fan unit (not shown) is mounted and on which wheels 24 are mounted to allow the vacuum cleaner 20 to be manoeuvred across a surface to be cleaned. A cleaner head 26 is pivotably mounted on the lower end of the main body 22 and a dirty air inlet 28 is provided in the underside of the cleaner head 26 facing the floor. Cyclonic separating apparatus 100 is provided on the main body 22 and ducting 30 provides communication between the dirty air inlet 28 and the cyclonic separating apparatus 100. A handle 32 is releasably mounted on the main body 22 behind the cyclonic separating apparatus 100 so that the handle 32 can be used either as a handle or in the manner of a wand. Such an arrangement is well known and will not be described any further here.

In use, the motor and fan unit draws dirty air into the vacuum cleaner 20 via either the dirty air inlet 28 or the handle 32 (if the handle 32 is configured for use as a wand). The dirty air is carried to the cyclonic separating apparatus 100 via the ducting 30 and entrained dirt and dust is separated from the airflow and retained in the cyclonic separating apparatus 100. The cleaned air is passed across the motor for cooling purposes and then ejected from the vacuum cleaner 20 via a plurality of outlet ports 34.

The present invention relates solely to the cyclonic separating apparatus 100 as will be described below and so the detail of the remaining features of the vacuum cleaners 10, 20 are comparatively immaterial.

Figure 3:
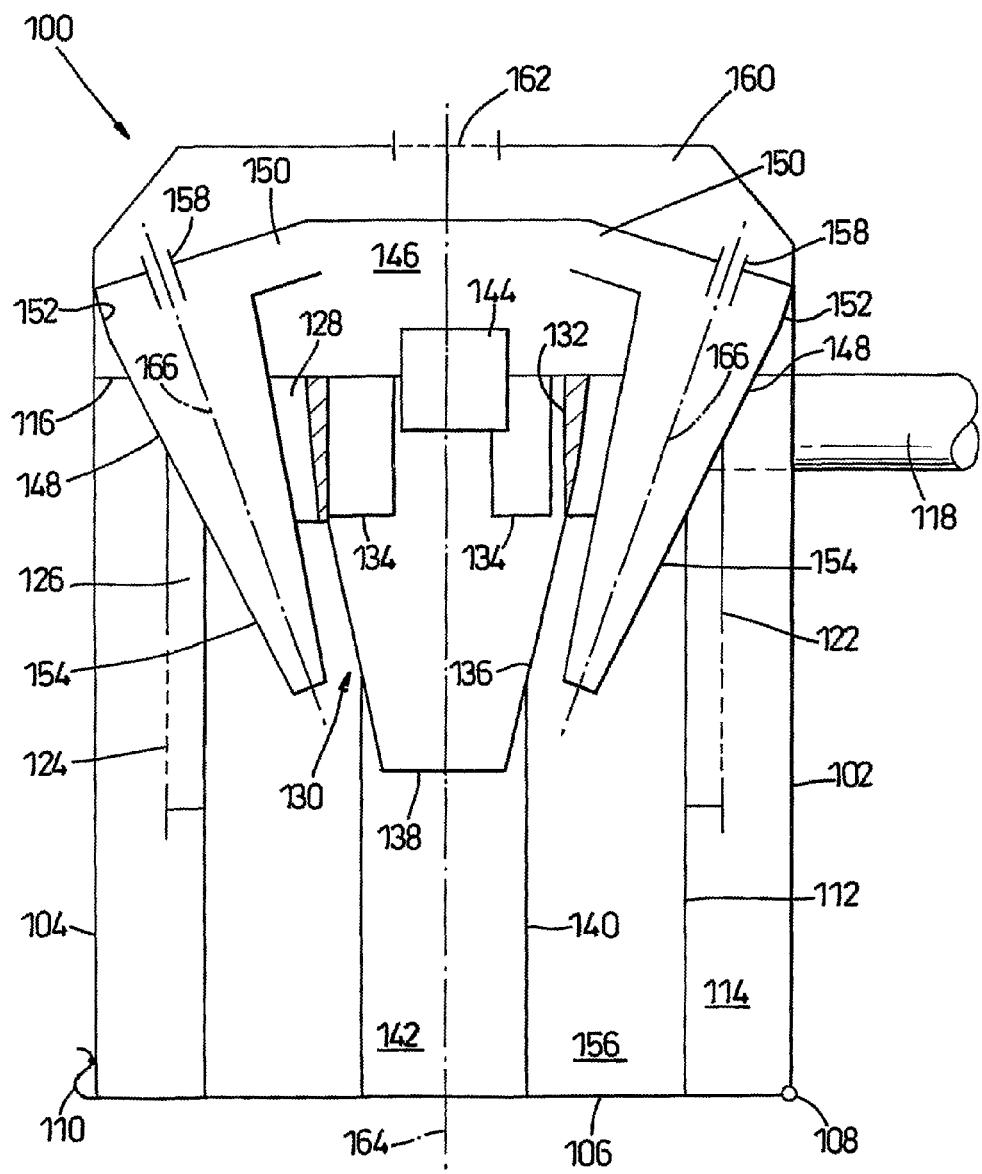
FIG. 3 is a sectional side view through the cyclonic separating apparatus forming part of either of the vacuum cleaners shown in FIGS. 1 and 2.
Figure 4:
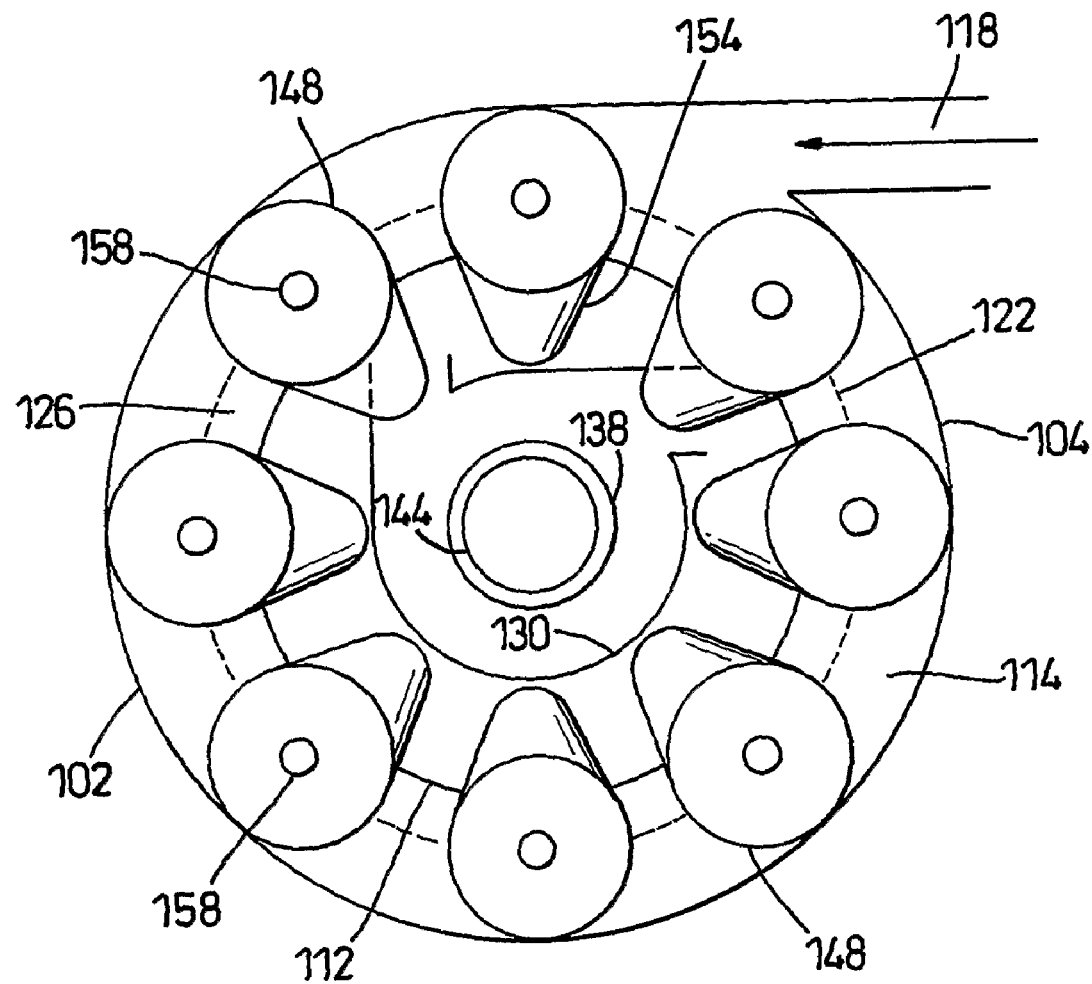
FIG. 4 is a sectional plan view of the cyclonic separating apparatus of FIG. 3 showing the layout of the cyclonic separating units.

The cyclonic separating apparatus 100 forming part of each of the vacuum cleaners 10, 20 is shown in FIGS. 3 and 4. The specific overall shape of the cyclonic separating apparatus 100 can be varied according to the type of vacuum cleaner in which the apparatus 100 is to be used. For example, the overall length of the apparatus can be increased or decreased with respect to the diameter of the apparatus, or the shape of the base can be altered so as to be, for example, frusto-conical.

The cyclonic separating apparatus 100 shown in FIGS. 3 and 4 comprises an outer bin 102 which has an outer wall 104 which is substantially cylindrical in shape. The lower end of the outer bin 102 is closed by a base 106 which is pivotably attached to the outer wall by means of a pivot 108 and held in a closed position (illustrated in FIG. 3) by a catch 110. In the closed position, the base is sealed against the lower end of the outer wall 104. Releasing the catch 110 allows the base 106 to pivot away from the outer wall 104 for purposes which will be explained below. A second cylindrical wall 112 is located radially inwardly of the outer wall 104 and spaced therefrom so as to form an annular chamber 114 therebetween. The second cylindrical wall 112 meets the base 106 (when the base is in the closed position) and is sealed thereagainst. The annular chamber 114 is delimited generally by the outer wall 104, the second cylindrical wall 112, the base 106 and an upper wall 116 positioned at the upper end of the outer bin 102.

A dirty air inlet 118 is provided at the upper end of the outer bin 102 below the upper wall 116. The dirty air inlet 118 is arranged tangentially to the outer bin 102 (see FIG. 4) so as to ensure that incoming dirty air is forced to follow a helical path around the annular chamber 114. A fluid outlet is provided in the outer bin 102 in the form of a shroud 120. The shroud 120 comprises a cylindrical wall 122 in which a large number of perforations 124 are formed. The only fluid outlet from the outer bin 102 is formed by the perforations 124 in the shroud. A passage 126 is formed between the shroud and the second cylindrical wall 112, which passage 126 communicates with an annular chamber 128.

The annular chamber 128 is arranged radially outwardly of the upper end of a tapering cyclone 130 which lies coaxially with the outer bin 102. The cyclone 130 has an upper inlet portion 132 which is generally cylindrical in shape and in which two air inlets 134 are formed. The inlets 134 are spaced about the circumference of the upper inlet portion 132. The inlets 134 are slot-like in shape and communicate directly with the annular chamber 128. The cyclone 130 has a tapering portion 136 depending from the upper inlet portion 132. The tapering portion 136 is frusto-conical in shape and terminates at its lower end in a cone opening 138.

A third cylindrical wall 140 extends between the base 106 and a portion of the outer wall of the tapering portion 136 of the cyclone 130 above the cone opening 138. When the base 106 is in the closed position, the third cylindrical wall 140 is sealed thereagainst. The cone opening 138 thus opens into an otherwise closed cylindrical chamber 142. A vortex finder 144 is provided at the upper end of the cyclone 130 to allow air to exit the cyclone 130.

The vortex finder 144 communicates with a plenum chamber 146 located above the cyclone 130. Arranged circumferentially around the plenum chamber 146 are a plurality of cyclones 148 arranged in parallel with one another. Each cyclone 148 has a tangential inlet 150 which communicates with the plenum chamber 146. Each cyclone 148 is identical to the other cyclones 148 and comprises a cylindrical upper portion 152 and a tapering portion 154 depending therefrom. The tapering portion 154 of each cyclone 148 extends into and communicates with an annular chamber 156 which is formed between the second and third cylindrical walls 112, 140. A vortex finder 158 is provided at the upper end of each cyclone 148 and each vortex finder 158 communicates with an outlet chamber 160 having an exit port 162 for ducting cleaned air away from the apparatus 100.

As has been mentioned above, the cyclone 130 is coaxial with the outer bin 102. The eight cyclones 148 are arranged in a ring which is centered on the axis 164 of the outer bin 102.

Each cyclone 148 has an axis 166 which is inclined downwardly and towards the axis 164. The axes 166 are all inclined to the axis 164 at the same angle. Also, the angle of taper of the cyclone 130 is greater than the angle of taper of the cyclones 148 and the diameter of the upper inlet portion 132 of the cyclone 130 is greater than the diameter of the cylindrical upper portion 152 of each of the cyclones 148.

In use, dirt-laden air enters the apparatus 100 via the dirty air inlet 118 and, because of the tangential arrangement of the inlet 118, the airflow follows a helical path around the outer wall 104. Larger dirt and dust particles are deposited by cyclonic action in the annular chamber 114 and collected therein. The partially-cleaned airflow exits the annular chamber 114 via the perforations 124 in the shroud 122 and enters the passage 126. The airflow then passes into the annular chamber 128 and from there to the inlets 134 of the cyclone 130. Cyclonic separation is set up inside the cyclone 130 so that separation of some of the dirt and dust which is still entrained within the airflow occurs. The dirt and dust which is separated from the airflow in the cyclone 130 is deposited in the cylindrical chamber 142 whilst the further cleaned airflow exits the cyclone 130 via the vortex finder 144. The air then passes into the plenum chamber 146 and from there into one of the eight cyclones 148 wherein further cyclonic separation removes some of the dirt and dust still entrained. This dirt and dust is deposited in the annular chamber 156 whilst the cleaned air exits the cyclones 148 via the vortex finders 158 and enters the outlet chamber 160. The cleaned air then leaves the apparatus 100 via the exit port 162.

Dirt and dust which has been separated from the airflow will be collected in all three of the chambers 114, 142 and 156. In order to empty these chambers, the catch 110 is released to allow the base 106 to pivot about the hinge 108 so that the base falls away from the lower ends of the cylindrical walls 104, 112 and 140. Dirt and dust collected in the chambers 114, 142, 156 can then easily be emptied from the apparatus 100.

It will be appreciated from the foregoing description that the apparatus 100 includes three distinct stages of cyclonic separation. The outer bin 102 constitutes a first cyclonic separating unit consisting of a single first cyclone which is generally cylindrical in shape. In this first cyclonic separating unit, the relatively large diameter of the outer wall 104 means that, primarily, comparatively large particles of dirt and debris will be separated from the airflow because the centrifugal forces applied to the dirt and debris are relatively small. Some fine dust will be separated as well. A large proportion of the larger debris will reliably be deposited in the annular chamber 114.

The cyclone 130 forms a second cyclonic separating unit. In this second cyclonic separating unit, the radius of the second cyclone 130 is smaller than that of the outer wall 104. The length of the second cyclone 130 is relatively small and the cone opening 138 is relatively large. The inlets 134 and the vortex finder 144 are enlarged in comparison to a finely-tuned cyclone so that the speed of the airflow inside the second cyclone 130 is relatively low. Appropriate selection of the dimensions of the second cyclone 130 allows the separation efficiency of the second cyclonic separating unit to be selected to be the same as that of the first cyclonic separating unit. However, the performance of the second cyclonic separating unit is enhanced in comparison to that of the first cyclonic separating unit because it is challenged with an airflow in which a smaller range of particle sizes is entrained, the larger particles having been removed in the first cyclone of the first cyclonic separating unit.

The third cyclonic separating unit is formed by the eight smaller cyclones 148. In this third cyclonic separating unit, each third cyclone 148 has an even smaller diameter than the second cyclone 130 of the second cyclonic separating unit and so is capable of separating finer dirt and dust particles than the second cyclonic separating unit. It also has the added advantage of being challenged with an airflow which has already been cleaned by the first and second cyclonic separating units and so the quantity and average size of entrained particles is smaller than would otherwise have been the case. The separation efficiency of the third cyclonic separating unit is considerably higher than that of the first and second cyclonic separating units.

The separation efficiency of the second cyclonic separating unit is the same as the separation efficiency of the first cyclonic separating unit and the separation efficiency of the third cyclonic separating unit is higher than the separation efficiency of the first and second cyclonic separating units. By this, we mean that each of the separation efficiencies of the first and second cyclones is lower than the separating efficiency of all eight third cyclones taken together.

Figure 5:
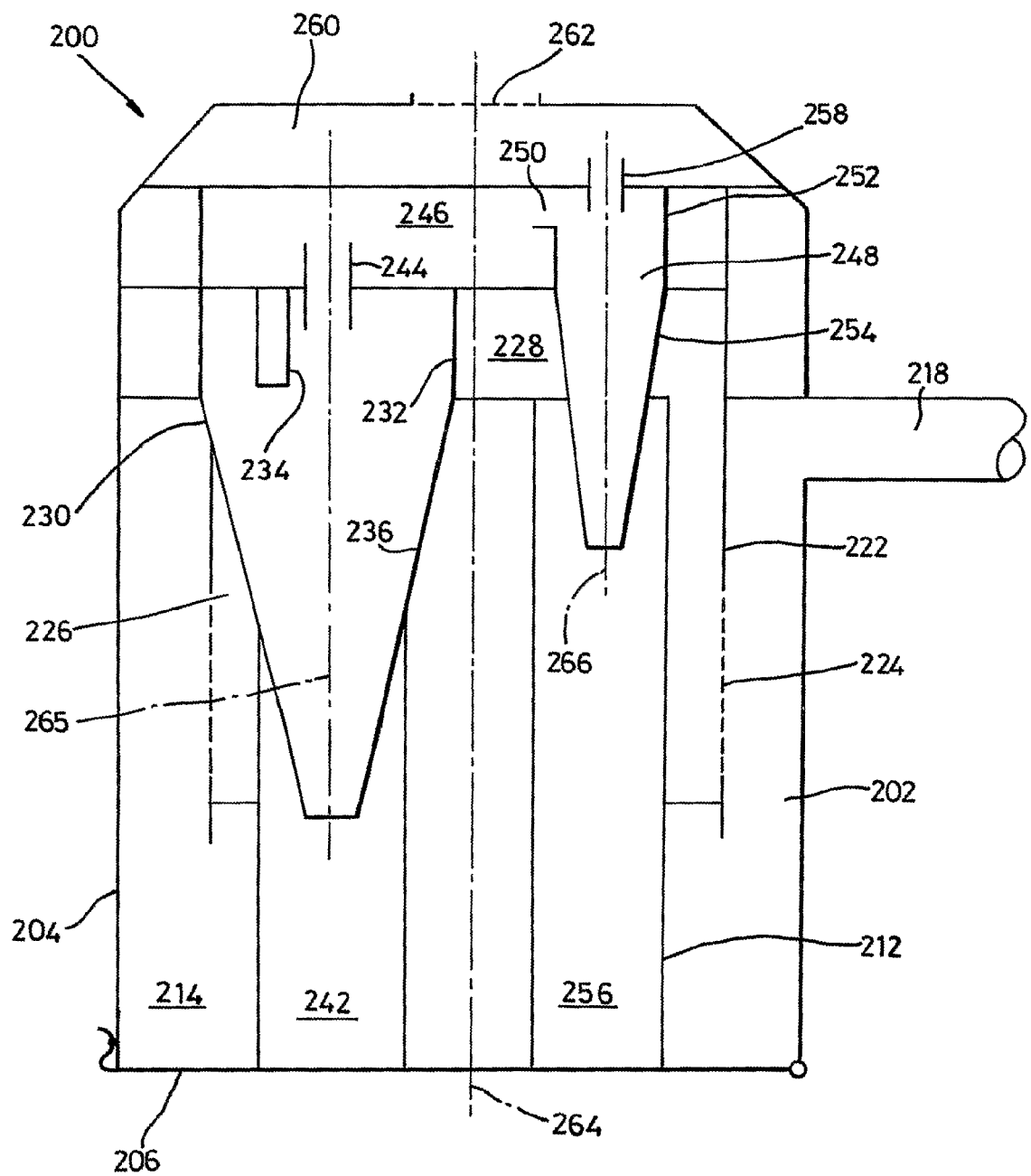
FIG. 5 is a sectional side view of an alternative embodiment of cyclonic separating apparatus according to the invention.
Figure 6:
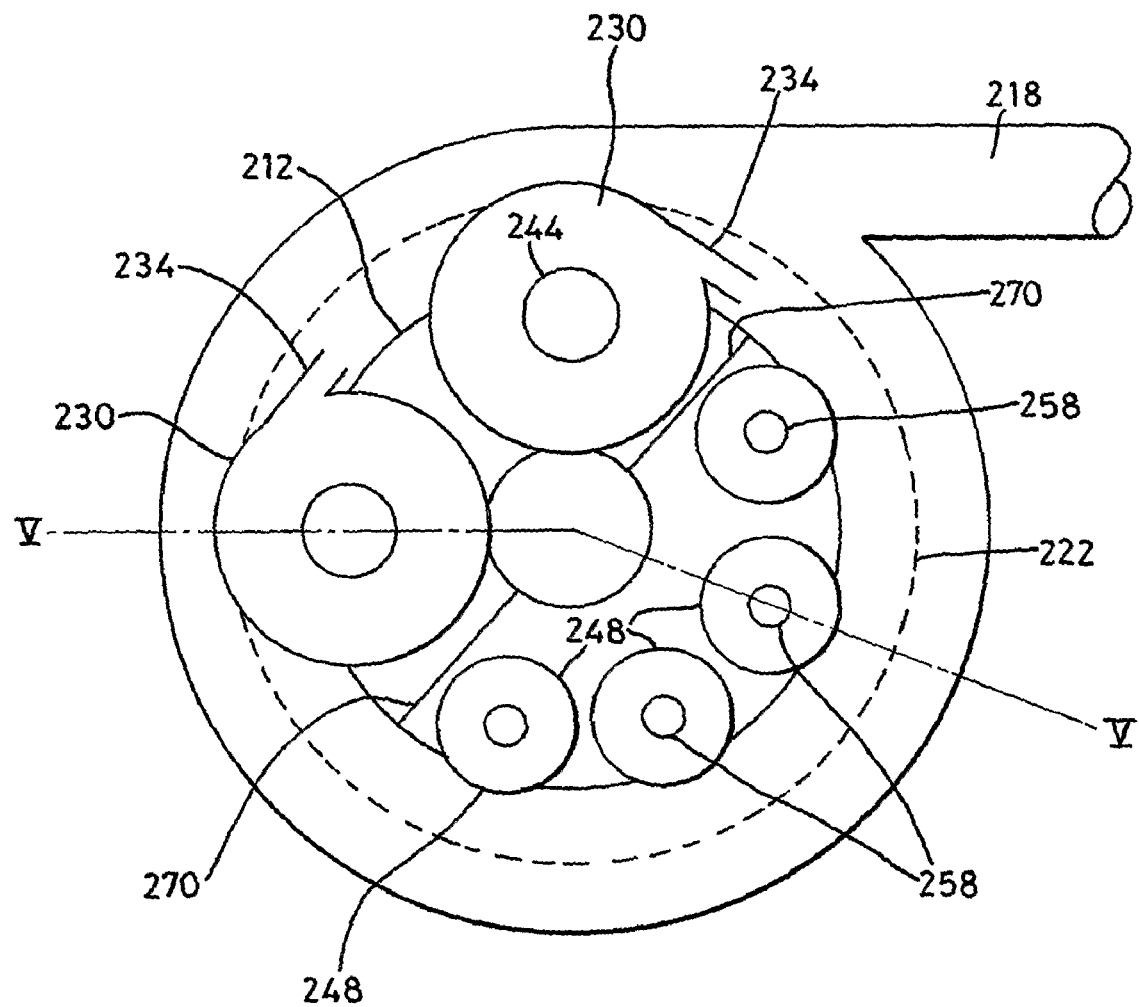
FIG. 6 is a sectional plan view of the cyclonic separating apparatus of FIG. 5 showing the layout of the cyclonic separating units.

A second embodiment of cyclonic separating apparatus 200 is shown in FIGS. 5 and 6. The apparatus 200 is similar in structure to the embodiment shown in FIGS. 3 and 4 and described in detail above in that it is suitable for use in either of the vacuum cleaners 10, 20 shown in FIGS. 1 and 2 and it comprises three successive cyclonic separating units.

As in the previously described embodiment, the first cyclonic separating unit consists of a single, cylindrical first cyclone 202 which is delimited by an outer cylindrical wall 204, a base 206 and a second cylindrical wall 212. A dirty air inlet 218 is provided tangentially to the outer wall 204 to ensure that cyclonic separation occurs in the first cyclone 202 and larger particles of dirt and debris are collected in the annular chamber 214 at the lower end of the cyclone 202. As before, the only exit from the first cyclone 202 is via the perforations 224 in the shroud 222 into a passage 226 located between the shroud 222 and the second cylindrical wall 212.

In this embodiment, the second cyclonic separating unit consists of two tapering second cyclones 230 arranged in parallel with one another. The second cyclones 230 are located side by side inside the outer wall of the apparatus 200 as can be seen in FIG. 6. Each second cyclone 230 has an upper inlet portion 232 in which at least one inlet 234 is provided. Each inlet 234 is orientated for tangential introduction of air into the upper inlet portion 232 and communicates with a chamber 228 which, in turn, communicates with the passage 226. Each second cyclone 230 has a frusto-conical portion 236 depending from the upper inlet portion 232 and terminating in a cone opening 238. The second cyclones 230 project into a closed chamber 242. Each second cyclone 230 has a vortex finder 244 located at the upper end thereof and communicating with a chamber 246.

The third cyclonic separating unit consists of four third cyclones 248 arranged in parallel. Each third cyclone 248 has an upper inlet portion 252 which includes an inlet 250 communicating with the chamber 246. Each third cyclone 248 also has a frusto-conical portion 254 depending from the inlet portion 252 and communicating with a closed chamber 256 via a cone opening. The chamber 256 is closed with respect to the chamber 242 by means of a pair of walls 270 (see FIG. 6). Each third cyclone 248 has a vortex finder 258 located at the upper end thereof and communicating with an outlet chamber 260 having an exit port 262.

The first cyclone 202 has an axis 264, each second cyclone 230 has an axis 265 and each third cyclone has an axis 266. In this embodiment, the axes 264, 265 and 266 lie parallel to one another. However, the diameters of the first, second and third cyclones 202, 230, 248 decrease in size.

The apparatus 200 operates in a manner similar to the operation of the apparatus 100 shown in FIGS. 3 and 4. Dirt-laden air enters the first cyclone 202 of the first cyclonic separating apparatus via the inlet 218 and circulates around the chamber 214 so that larger dirt particles and debris are separated by cyclonic action. The dirt and dust collects in the lower portion of the chamber 214 whilst the cleaned air exits the chamber 214 via the perforations 224 in the shroud 222. The air passes through the passage 226 to the chamber 228 and then to the inlets 234 of the second cyclones 230. Further cyclonic separation takes place in the second cyclones 230, which operate in parallel. Dirt and dust separated from the airflow is deposited in the chamber 242 whilst the further cleaned air exits the second cyclones 230 via the vortex finders 244. The air then enters the third cyclones 248 via the inlets 250 and further cyclonic separation takes place therein with separated dirt and dust being deposited in the chamber 256. The cleaned airflow exits the apparatus 200 via the chamber 260 and the exit port 262.

In the embodiment shown in FIGS. 5 and 6, the second cyclones 230 are designed so that the second cyclonic separating unit has a separation efficiency which is the same as the separation efficiency of the third cyclonic separation unit. This can be achieved by providing the second cyclones 230 with relatively small inlets 234 and vortex finders 244 and by providing each second cyclone 230 with a relatively long, relatively slender frusto-conical portion 236.

Each cyclonic separating unit removes a proportion of entrained dirt and dust from the airflow. This allows the second and third cyclonic separating units to operate more effectively because they are challenged with an airflow in which a smaller range of particles is entrained.

Figure 7:
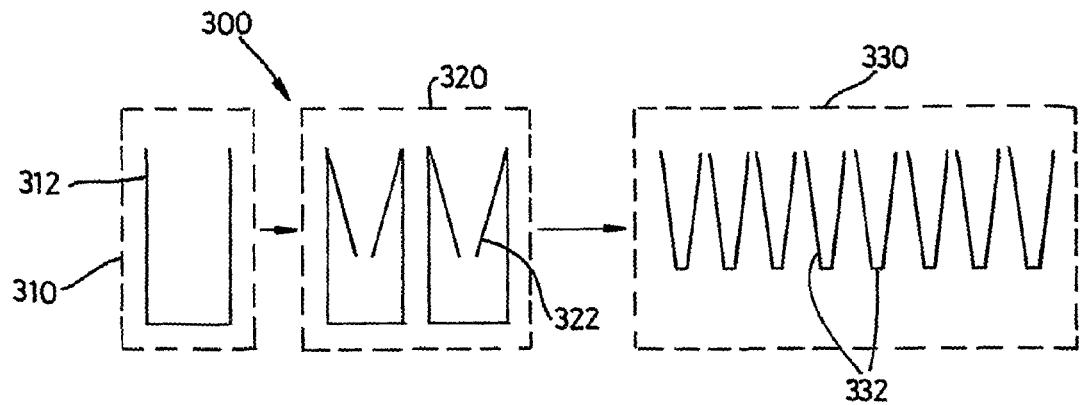
FIG. 7 is a schematic diagram of first alternative cyclonic separating apparatus suitable for forming part of either of the vacuum cleaners shown in FIGS. 1 and 2.
Figure 8:
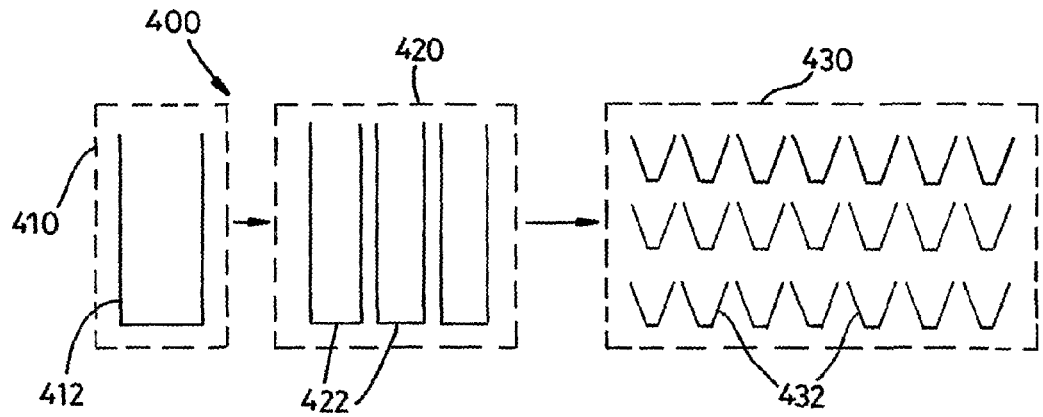
FIGS. 8 and 9 are schematic diagrams of second and third alternative cyclonic separating apparatuses suitable for forming part of either of the vacuum cleaners of FIGS. 1 and 2.
Figure 9:
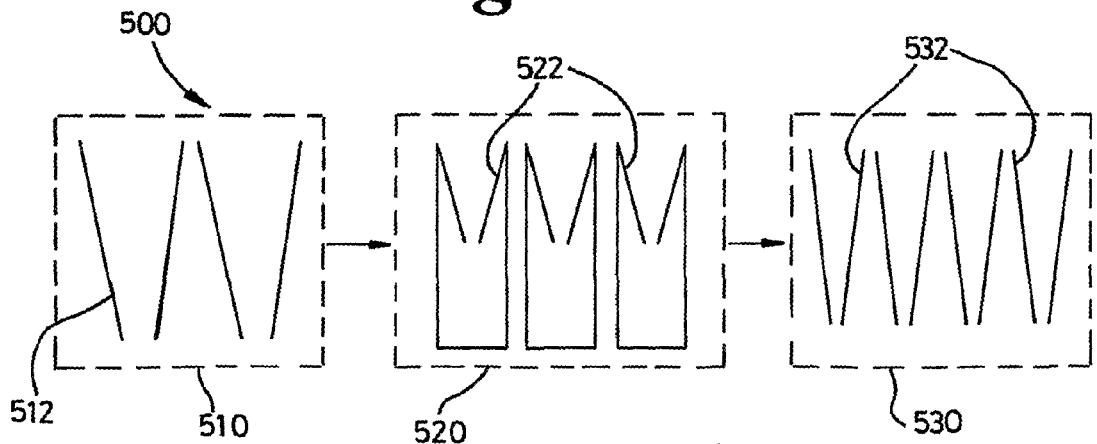

Each of the cyclonic separating units can consist of different numbers and different shapes of cyclone. FIGS. 7 to 9 illustrate schematically three further alternative configurations which fall within the scope of this invention. In these illustrations, all detail will be omitted other than the number and general shape of the cyclones which make up each cyclonic separating unit.

Firstly, in FIG. 7, the apparatus 300 comprises a first cyclonic separating unit 310, a second cyclonic separating unit 320 and a third cyclonic separating unit 330. The first cyclonic separating unit 310 comprises a single first cyclone 312 which is cylindrical in shape. The second cyclonic separating unit 320 comprises two frusto-conical second cyclones 322 arranged in parallel and the third cyclonic separating unit 330 comprises eight frusto-conical third cyclones 332, also arranged in parallel. In this embodiment, the dimensions of the third cyclones 332 are much smaller than those of the second cyclones 322 and the separating efficiency of the third cyclonic separating unit 330 is higher than that of the second cyclonic separating unit 320. The separating efficiency of the second cyclonic separating unit 320 is arranged to be substantially the same as that of the first cyclonic separating unit 310.

In the arrangement shown in FIG. 8, the apparatus 400 comprises a first cyclonic separating unit 410, a second cyclonic separating unit 420 and a third cyclonic separating unit 430. The first cyclonic separating unit 410 comprises a single first cyclone 412 which is cylindrical in shape. The second cyclonic separating unit 420 comprises three cylindrical second cyclones 422 arranged in parallel and having diameters which are considerably smaller than the diameter of the first cyclone 410. The third cyclonic separating unit 430 comprises twenty-one frusto-conical third cyclones 432, also arranged in parallel. The dimensions of the third cyclones 432 will be very much smaller than those of the second cyclones 422 and so the separating efficiency of the third cyclonic separating unit 430 will be higher than that of the second cyclonic separating unit 420. The separating efficiency of the second cyclonic separating unit 420 is again arranged to be substantially the same as that of the first cyclonic separating unit 410.

In the arrangement shown in FIG. 9, the apparatus 500 comprises a first cyclonic separating unit 510, a second cyclonic separating unit 520 and a third cyclonic separating unit 530. The first cyclonic separating unit 510 comprises two, relatively large first cyclones 512 which are frusto-conical in shape. The second cyclonic separating unit 520 comprises three frusto-conical second cyclones 522 arranged in parallel but having diameters which are considerably smaller than the diameter of the first cyclones 510. The third cyclonic separating unit 530 comprises four frusto-conical third cyclones 532, also arranged in parallel. The dimensions of the third cyclones 532 will be smaller again than those of the second cyclones 522 but the separating efficiency of the second cyclonic separating unit 520 is arranged to be substantially the same as that of the third cyclonic separating unit 530. These separation efficiencies are higher than the separation efficiency of the first cyclonic separating unit 510.

The arrangements illustrated in FIGS. 7 to 9 are intended to show that the number and shape of the cyclones forming each cyclonic separating unit can be varied. It will be understood that other arrangements are also possible. For example, the first and second cyclonic separating units may each comprise a single cyclone and the third cyclonic separating unit may comprise fourteen cyclones arranged in parallel. Further, another suitable arrangement is to use a first cyclonic separating unit comprising a single cyclone, a second cyclonic separating unit comprising two cyclones in parallel and a third cyclonic separating unit comprising eighteen cyclones in parallel.

It will be understood that further cyclonic separating units can be added downstream of the third cyclonic separating unit if desired. It will also be understood that the cyclonic separating units can be physically arranged to suit the relevant application. For example, the second and/or third cyclonic separating units can be arranged physically outside the first cyclonic separating unit if space permits. Equally, if any one of the cyclonic separating units includes a large number of cyclones, the cyclones can be arranged in two or more groups or include cyclones of different dimensions. Furthermore, the cyclones included within a multi-cyclone separating unit can be arranged such that their axes lie at different angles of inclination to the central axis of the apparatus. This can facilitate compact packaging solutions.

The invention claimed is:

1. A cyclonic separating apparatus, comprising:
   a first cyclonic separating unit including at least one first cyclone;
   a second cyclonic separating unit located downstream of the first cyclonic separating unit and including at least one second cyclone; and
   a third cyclonic separating unit located downstream of the second cyclonic separating unit and including at least two third cyclones;
   wherein a separation efficiency of the second cyclonic separating unit is substantially the same as a separation efficiency of either the first cyclonic separating unit or the third cyclonic separating unit, and
   wherein a number of third cyclones is greater than a number of second cyclones.

2. The cyclonic separating apparatus of claim 1, wherein the separation efficiency of the second cyclonic separating unit is the same as the separation efficiency of the first cyclonic separating unit.

3. The cyclonic separating apparatus of claim 1, wherein the separation efficiency of the second cyclonic separating unit is the same as the separation efficiency of the third cyclonic separating unit.

4. The cyclonic separating apparatus of claim 1, 2 or 3, wherein the first cyclonic separating unit includes a single first cyclone.

5. The cyclonic separating apparatus of claim 1, 2 or 3, wherein each first cyclone is substantially-cylindrical.

6. The cyclonic separating apparatus of claim 1, 2 or 3, wherein the second cyclonic separating unit comprises a plurality of second cyclones arranged in parallel and the third cyclonic separating unit comprises a plurality of third cyclones arranged in parallel.

7. The cyclonic separating apparatus of claim 6, wherein the second cyclones are substantially identical to one another and the third cyclones are substantially identical to one another.

8. The cyclonic separating apparatus of claim 1, 2 or 3, wherein each second and third cyclone is tapering in shape.

9. The cyclonic separating apparatus of claim 8, wherein each of the second and third cyclones is frusto-conical.

10. The cyclonic separating apparatus of claim 9, wherein the angle of taper of each second cyclone is greater than the angle of taper of each third cyclone.

11. The cyclonic separating apparatus of claim 1, 2 or 3, wherein each second cyclone has at least two inlets which communicate with the first cyclonic separating unit.

12. The cyclonic separating apparatus of claim 11, wherein the inlets to each second cyclone are circumferentially spaced about an axis of the relevant second cyclone.

13. The cyclonic separating apparatus of claim 1, 2 or 3, wherein each cyclonic separating unit has a collector which can be emptied simultaneously with other collectors.

14. The cyclonic separating apparatus of claim 1, 2 or 3, further comprising additional cyclonic separating units downstream of the third separating unit.

15. A vacuum cleaner comprising the cyclonic separation apparatus of claim 1, 2 or 3.

16. The cyclonic separating apparatus of claim 4, wherein each first cyclone is substantially cylindrical.

17. The cyclonic separating apparatus of claim 4, wherein the second cyclonic separating unit comprises a plurality of second cyclones arranged in parallel and the third cyclonic separating unit comprises a plurality of third cyclones arranged in parallel.

18. The cyclonic separating apparatus of claim 17, wherein the second cyclones are substantially identical to one another and the third cyclones are substantially identical to one another.

19. The cyclonic separating apparatus of claim 4, wherein each second and third cyclone is tapering in shape.

20. The cyclonic separating apparatus of claim 19, wherein each of the second and third cyclones is frusto-conical.

21. The cyclonic separating apparatus of claim 20, wherein the angle of taper of each second cyclone is greater than the angle of taper of each third cyclone.

22. A cyclonic separating apparatus, comprising:
a first cyclonic separating unit including at least one first cyclone;
a second cyclonic separating unit located downstream of the first cyclonic separating unit and including at least one second cyclone; and
a third cyclonic separating unit located downstream of the second cyclonic separating unit and including at least one third cyclone;
wherein a separation efficiency of the second cyclonic separating unit is substantially the same as a separation efficiency of either the first cyclonic separating unit or the third cyclonic separating unit, and
wherein each second cyclone has at least two inlets which communicate with the first cyclonic separating unit.

23. The cyclonic separating apparatus of claim 22, wherein the inlets to each second cyclone are circumferentially spaced about an axis of the relevant second cyclone.

* * * * *